US010677629B1

(12) United States Patent
Javey et al.

(10) Patent No.: US 10,677,629 B1
(45) Date of Patent: Jun. 9, 2020

(54) SYSTEM AND METHOD FOR UTILIZING DISTRICT METERING AREAS BASED ON METER DESIGNATIONS

(71) Applicant: Badger Meter, Inc., Milwaukee, WI (US)

(72) Inventors: Shahram Javey, Los Gatos, CA (US); Douglas Bergh, Los Gatos, CA (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

(21) Appl. No.: 16/404,122

(22) Filed: May 6, 2019

(51) Int. Cl.
*G01F 15/06* (2006.01)
*G06Q 50/06* (2012.01)
*G01F 15/075* (2006.01)
*G01F 15/00* (2006.01)

(52) U.S. Cl.
CPC .......... *G01F 15/061* (2013.01); *G01F 15/003* (2013.01); *G01F 15/0755* (2013.01); *G06Q 50/06* (2013.01)

(58) Field of Classification Search
CPC .... G01F 15/003; G01F 15/061; G01F 15/063; G01F 15/065–066; G01F 15/068; G01F 15/0755; G06Q 30/0207; G06Q 30/0282; G06Q 30/08; G06Q 50/06; G07F 17/32; G07F 17/323
See application file for complete search history.

(56) References Cited

U.S. PATENT DOCUMENTS

| 2011/0227754 | A1* | 9/2011 | Hill | G06Q 50/06 340/870.01 |
| 2016/0019663 | A1* | 1/2016 | Mani | G06O 50/06 700/291 |
| 2016/0021433 | A1* | 1/2016 | Mani | H04Q 9/00 340/870.07 |
| 2016/0021525 | A1* | 1/2016 | Mani | H04W 8/005 455/434 |
| 2016/0021613 | A1* | 1/2016 | Mani | H04W 52/0209 370/311 |
| 2018/0298746 | A1* | 10/2018 | Short | E21B 41/00 |
| 2019/0007186 | A1* | 1/2019 | Nguyen | H04L 1/1867 |
| 2019/0007333 | A1* | 1/2019 | Monier | H04L 47/245 |
| 2019/0165961 | A1* | 5/2019 | Bartier | H04L 12/185 |
| 2019/0165962 | A1* | 5/2019 | Bartier | H04L 45/16 |
| 2019/0165964 | A1* | 5/2019 | Bartier | H04L 49/201 |

\* cited by examiner

*Primary Examiner* — Orlando Bousono
(74) *Attorney, Agent, or Firm* — Boyle Fredrickson S.C.

(57) ABSTRACT

A computer implemented method implemented on a computer system includes non-transient memory storing instructions for configuring a plurality of district metering areas within a utility supply network. The method includes identifying a plurality of flow measurement devices, wherein each flow measurement device is connected by a directional connection to at least one other flow measurement device, generating a utility supply network representation based on the directional connections between the flow measurement devices, and generating a plurality of district metering areas for the utility supply network representation, each district metering area being a directed acyclic graph based on the directional connections and including a subset of the plurality of flow measuring devices and including at least one flow measurement device designated as a supply meter and at least one flow measurement device designated as a demand meter.

16 Claims, 5 Drawing Sheets

SYSTEM AND METHOD FOR UTILIZING DISTRICT METERING AREAS BASED ON METER DESIGNATIONS

FIELD OF THE INVENTION

This invention relates to designation, formation and utilization of district metering areas in a utility supply network. More particularly, the invention is directed to a system and method for implementing and utilizing one or more district meter areas based on designations of the utility meters in the utility supply network to manage and improve the operation of the utility supply network.

BACKGROUND

A utility supply network is utility specific system including at least one utility source, a distribution network, and one or more utility usage endpoints. For example, a water utility supply network may include one or more of a drainage basin, a water collection point such as a lake, river, aquifer, a water purification plant, etc. as a water source, a water pipe network for distributing the water, and one or more homes, businesses, fountains, hydrants, etc. receiving the water from the water pipe network as water usage endpoint. These systems are usually owned and maintained by local governments, such as cities, or other public entities, but are occasionally operated by a commercial enterprise.

Utilities monitor the utility supply throughout the utility supply network. For example, a utility typically monitors the net amount of a utility supply entering a utility supply network from utility source(s), the utility supply within the supply network, the supply network itself, the utility supply delivered at utility supply endpoints, etc. The utility supply and the utility supply network are monitored to identify usage, quality, etc. as well as to identify potential issues such as outages, theft, leakage, contamination, etc. For example, a utility can detect utility supply loss by subtracting the utility supply added to the utility supply network from the water source(s) minus the aggregate amount removed from the utility supply network at the utility usage endpoint. The amount removed from the utility supply network at the utility usage endpoint is monitored by utility meters specific to the usage endpoint and communicated to the utility. The utility supply loss can be caused by a variety of issues such as theft, metering issues, utility supply network breakages such as pipe breaks, power line breaks, etc., utility supply network deterioration such as leaky pipes, aging wiring, etc.

Utility supply loss can have a significant impact for a number of reasons. The utility supply loss can have a significant environmental impact. For example, water is becoming a scare commodity and losses increase the amount of water that is removed with lakes, rivers, aquifers, etc. in order to meet user demand. Further, water leakage can cause erosion, property damages, infrastructure damage, sinkholes, etc. that have negative economic and safety consequences. Utility supply loss can also have a significant financial impact for the utility supplier.

Although monitoring inputs and outputs to utility supply networks has been recognized as valuable, the value of monitoring only inputs and outputs to the entire utility supply network has dropped as networks increase in size and complexity. For example, a water supply network may have a loop or branch network topology, or a combination of both, piping networks may be circular or rectangular, may include miles of pipes, etc.

To manage the complexity, utility supply networks may be divided into zones or district metering areas (DMA). Each DMA may be designated by the utility to include a water supply area with flow in to or out of each area metered by flowmeters. Each zone typically has one or more meters measuring flow into the zone, designated as a supply meter and several meters measuring usage within the zone, designated as demand meters. Accordingly, every flow meter within a designated zone is assigned to the same District Metering Area and designated as either a supply meter or a demand meter. The aggregate of the district metering areas is typically the entire utility supply network.

Managers of utility supply networks use zone information for a variety of applications to improve the overall control of the utility being supplied. For example, in a water supply network, applications can include calculation of water loss, identification and quantification of unaccounted for water, deduct metering, leak detection, computer sizing, and numerous other applications. Given the variety in utilization of the information associated with district meeting areas, it is important to properly designate the utility meters within a DMA and within a supply network as a whole based on the application to be implemented. Accordingly, software may be used to designate each meter in a utility supply network to a DMA based on a variety of factors. However, such DMAs are inherently limited to a simple network topology that may not be sufficient to maximize DMA utility for complex network topologies and/or variable DMA information utilization.

What is needed is a system and method configured to facilitate specification of a representation of a utility supply network using one or more district metering areas in a complex supply network. What is further needed is such software where the meters in the utility supply network are designated as supply meters or demand meters for different district metering areas.

SUMMARY OF THE INVENTION

This invention provides a system for facilitating representation of a utility supply network using one or more district metering areas where the meters in the utility supply network are designated as supply meters or demand meters for different district metering areas. The designation greatly simplifies the specification of a network graph to represent a district metering area. Further, such designation facilitates visualization of the utility consumption for a zone in terms of all supplies versus all demands. The district metering areas further improve recognition and notification functions for triggering events.

In one more detailed aspect a computer implemented method implemented on a computer system including non-transient memory storing instructions for configuring a plurality of district metering areas within a utility supply network is shown. The method includes identifying a plurality of flow measurement devices, wherein each flow measurement device is connected by a directional connection to at least one other flow measurement device, generating a utility supply network representation based on the directional connections between the flow measurement devices, and generating a plurality of district metering areas for the utility supply network representation, each district metering area being a directed acyclic graph based on the directional connections and including a subset of the plurality of flow measuring devices and including at least one flow measurement device designated as a supply meter and at least one flow measurement device designated as a demand meter. At least one flow measurement device may be designated as a supply meter in a first district metering area and designated as a demand meter in a second district metering area.

In an exemplary embodiment, the method includes generating a listing of flow measurement devices that are not included in a subset for a district metering area for the utility supply network representation.

In another embodiment, the method includes determining a net utility flow discrepancy based on a comparison of the aggregate supply flow, measured by flow meters designated as supply meters, and the aggregate demand flow, measured by flow meters designated as demand meters.

In another embodiment, the method includes replacing one or more meters in a district metering area based on a determination that the aggregate supply flow has been less than the aggregate demand flow over one of a defined period of time and a defined amount. Alternatively and/or additionally, the method may include initiating loss mitigation in a district metering area based on a determination that the aggregate supply flow has been greater than the aggregate demand flow over one of a defined period of time and a defined amount or modifying the operation of one or more flow measurement devices based on the determined net utility flow discrepancy.

In another more detailed aspect, a computer system executing instructions, stored in non-transient memory, for configuring a plurality of district metering areas within a utility supply network is provided. The system includes a network control system configured to identify a plurality of flow measurement devices, wherein each flow measurement device is connected by a directional connection to at least one other flow measurement device and generate a utility supply network representation based on the directional connections between the flow measurement devices. The system further includes a district metering system configured to generate a plurality of district metering areas for the utility supply network representation, each district metering area being a directed acyclic graph based on the directional connections and including a subset of the plurality of flow measuring devices and including at least one flow measurement device designated as a supply meter and at least one flow measurement device designated as a demand meter. At least one flow measurement device may be designated as a supply meter in a first district metering area and designated as a demand meter in a second district metering area.

Other aspects of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE INVENTION

Figure 1:
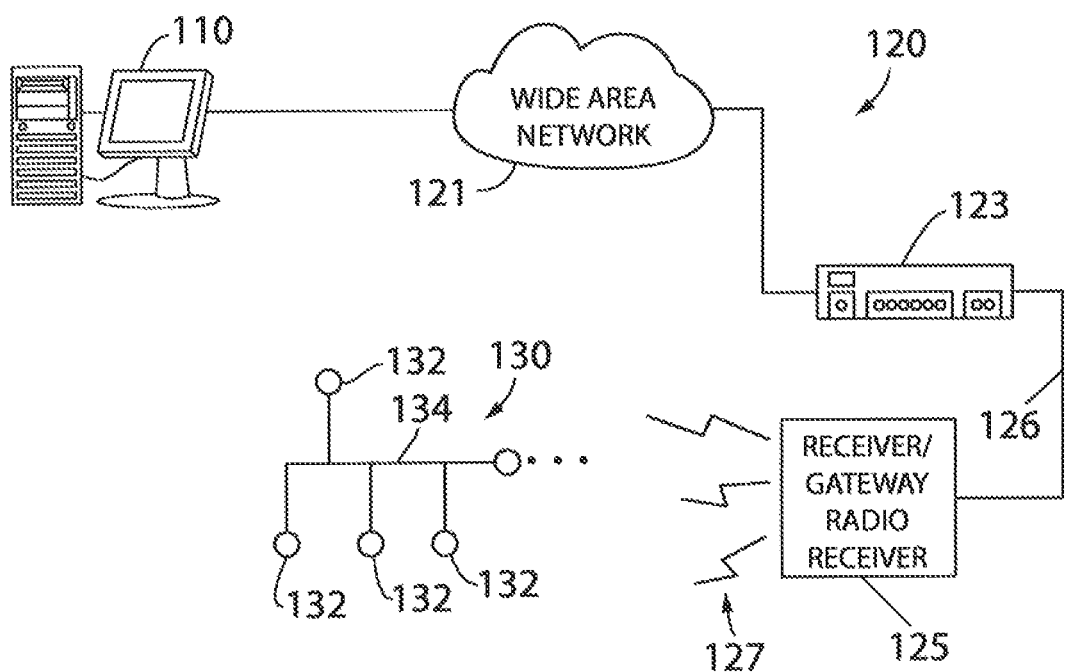
FIG. 1 is a utility supply network environment for monitoring and controlling provision of a utility supply to endpoints, according to an exemplary embodiment.

Referring first to FIG. 1, a utility supply network environment 100 for monitoring and controlling provision of a utility supply to endpoints is shown, according to an exemplary embodiment. The utility supply network environment 100 includes a network control system 110, a network communication system 120, and a utility supply network 130. Utility supply network environment 100 may have a variety of configurations and include additional systems such as a billing system, a utility supply monitoring system, a utility supply quality control system, etc. that are not shown in this simplified environment.

Utility supply network control system 110 is provided for collecting flow measurement data from a network of flow measurement devices 132 in the utility supply network 130, such as utility meters, distributed within a geographic area served by a utility. The network control system 110 typically is connected to additional systems, such as a billing computer (not shown) which requests data and imports a data file from the control system 10 to obtain meter data to produce customer statements of account for utility usage, a monitoring system for monitoring exception conditions such as leakage or tampering or shut-off conditions, a quality monitoring system for detecting any issues with the utility being supplied such as contamination, degradation, etc. It is also possible that, in some embodiments, the functions of these separate computers could be combined in a single computer running multiple application programs. In this exemplary embodiment, the system is described as being a water utility supply network, however, in other embodiments, the utility can a different type of utility, such as gas or electricity.

The control system 110 communicates with utility supply network 130 through network communication system 120. In the exemplary communication system 120 shown, control system 110 communicates over a wide area network (WAN) 121, such as the Internet, to a router 123. Router 123, in turn, communicates with utility supply network 130 through a receiver 125 receiving radio frequency (RF) signals 127, as described in further detail below. Sometimes the receiver 125 is also referred to as a "gateway" because it interfaces between the local area wireless network and another longer-range network 121.

Utility supply network 130 includes a network of flow measurement devices 132, each including a utility meter, a transducer and an RF (radio frequency) transmitter and a utility supply conduit 134. In this example, the units 132 can be meter reading and transmitting units commercially offered under the Orion® trademark or the Galaxy® trademark by the assignee of the present invention. These flow measurement devices 132 transmit radio frequency (RF) signals 127 to a receiver 125 to form a local area wireless network. It should be understood that there is typically more than one receiver 125 in a network, although only one is illustrated in FIG. 1. In an exemplary embodiment, the flow measurement devices 132 may be or include sensors for sensing other types of conditions at the utility meter or in supply links connected to the utility meters. These sensors may be connected to Orion® or Galaxy® radio transmitters to transmit status data to the receiver 125.

Utility supply network 130 is shown in an abbreviated form in FIG. 1 for illustrative purpose. One of ordinary skill in the art would understand that network 130 may include hundreds or thousands of flow measurement devices 132 and miles of utility supply conduit. Further, the type, configuration, size, etc. of the network 130 will vary greatly depending on the utility supply needs. For example, a large city having a large number of residential, commercial and industrial locations with significant terrain variations will have a significantly more complex network 130 than a small residential community. Exemplary networks 130 are shown and described below with reference to FIGS. 2A-2B to illustrate a few possible configurations of supply networks.

The flow measurement devices 132 transmit data-encoded RF signals over low power RF frequencies either in the non-FCC-licensed ISM (Industrial-Scientific-Medical) band from 902 MHz to 928 MHz. (Orion® AMR systems) or in the FCC-licensed frequencies such as 150-200 Mhz, 325 MHz, 433.92 MHz or from 450 to 470 MHz (Galaxy® AMR systems). The flow measurement devices 132 transmit flow and other meter data to an RF receiver 125, which in this case is an Orion® receiver, that is connected via a wired Ethernet local network 126 to a WAN (Internet) router 123. In other embodiments, a wireless connection between the receiver and the router can be used. The router 123 is connected to a wide area network 121, in this embodiment to the Internet. In another embodiment, the receiver 125 is a gateway receiver of the type offered under the Galaxy® trademark. The control system 110 is also connected to the wide area network 121, the Internet, and can address the receivers 125 at a receiver network address which can be an Internet Protocol (IP) address of the format WWW.XXX.YYY.ZZZ—where W, X, Y and Z are values in a range from "0" to "255", such as for example: 192.168.1.175. The receiver network address can also be a uniform resource locator (URL) in the form: http://www-.google.com. As used herein, the term "meter data" should be understood to include either utility consumption data or condition status data, or both. Condition status data includes leak detection data, tamper data and shut-off valve data and other types of data concerning meter operation besides actual utility consumption data.

Figure 5:
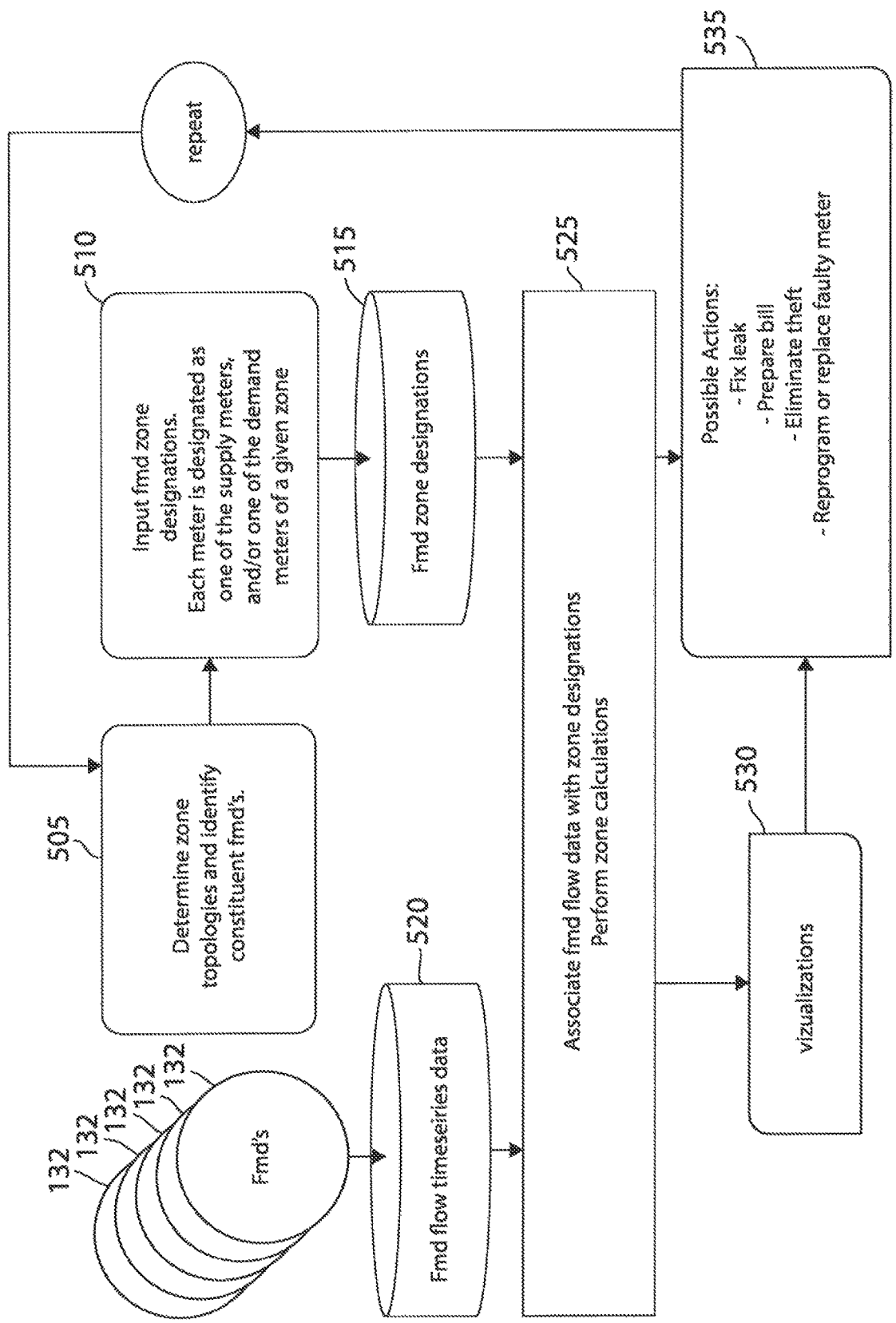
FIG. 5 is a flow chart illustrating the steps implemented by the DMA algorithm stored in the memory to configure a district metering area, according to an exemplary embodiment.

The method and system of the present invention is implemented by control system 110 with network access to the Internet 121. The method of the invention includes communication with the receiver(s) 125 using a receiver network address that has been preset in the receiver 125 and provided to the control system 110. The control system 110 operates under the control of a stored computer program including a district metering area configuration routine, as represented by FIG. 5. The blocks in the illustrations in FIG. 5 represent one or more program instructions in the stored computer program that are executed by a processor in the control system 110. The computer program is stored in the memory in the control system 110 but can also be stored in a tangible data storage medium or in a file for transmission on the Internet.

The invention provides a method and a system for the collection of meter data from the flow measurement devices 132 of the utility supply network and for providing improved utility supply network control based on allocation of the flow measurement devices 132 into district metering areas as described below. The improvement to utility supply network control is provided by improving the generation and monitoring of district metering areas as described below with reference to FIGS. 2-4.

Figure 2B:
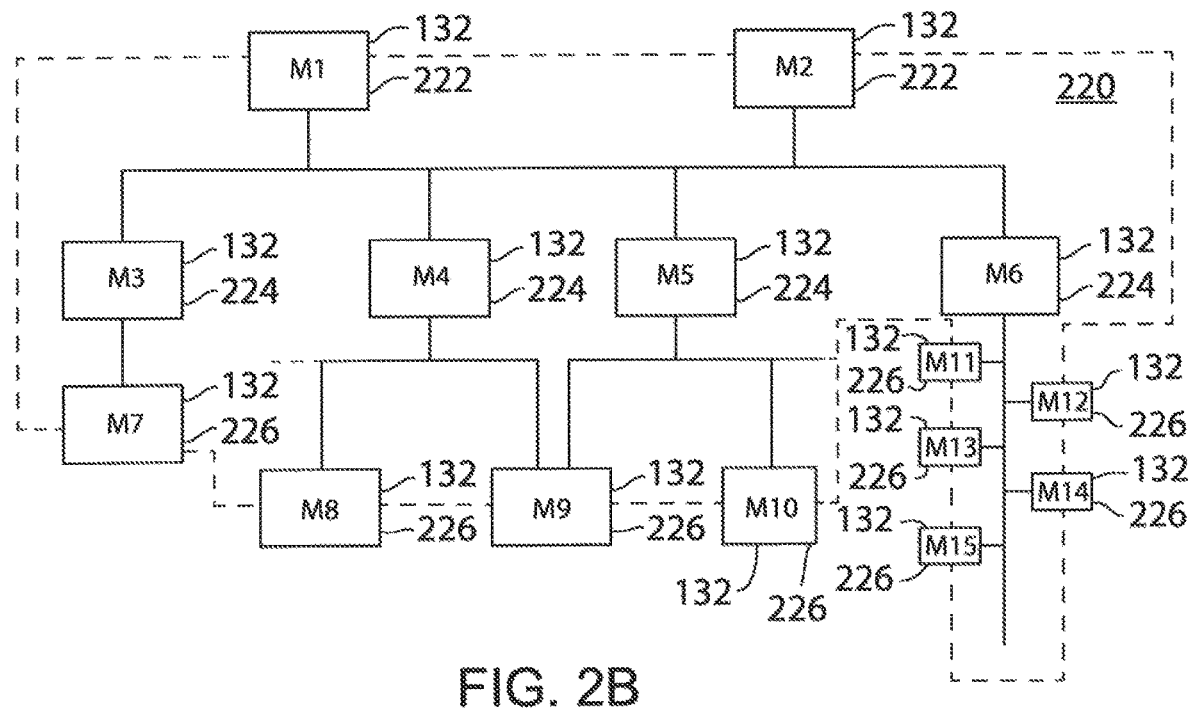
FIGS. 2A-B are block diagram representations of exemplary utility supply networks, according to an exemplary embodiment.
Figure 2A:
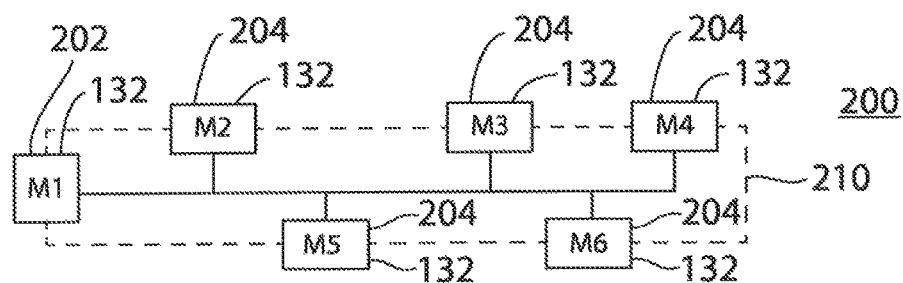

Referring now also to FIG. 2A, a utility supply network 200 is shown according to an exemplary embodiment. Utility supply network 200 may be a virtual representation of an actual utility supply network including, e.g., pipes and meters. Utility systems essentially form a network that represents a computational graph. Specifying this network in a way that is simple and easy to define and uses a challenge. A utility supply network may have thousands, hundreds of thousands or even millions of flow measurement devices. Network control system 110 is configured to implement a system and method of identifying and describing a DMA zone by designating each meter as a supply or demand meter for the zone. This minimal information will allow it utility supplier to perform analytics such as validating the integrity of the network and identifying usage characteristics and anomalies such as water loss.

Utility supply network 200 includes a plurality of flow measurement devices 132 measuring flow into and out of the supply network 200. Utility supply network 200 is a simple supply network such as would be found for an apartment building wherein each of the units in the apartment complex is separately metered. Accordingly, in this example, supply network 200 includes an apartment building flow measurement device 202 measuring from the flow being received from, e.g., a municipal water supply, and distributed to a plurality of apartment unit flow measurement devices 204 measuring the flow used by each of the individual apartment units. In this example, the municipal water supply is the utility source, the apartment pipes are the distribution network, and the individual apartments are the utility usage endpoint. One of ordinary skill in the art would be able to appreciate that supply network 200 may be used to model distribution to residences on a city street, distribution from a water reservoir to local distribution stations, etc.

The network control system 110 is configured to generate a district metering area 210 for the utility supply network. Each district metering area includes at least one flow measurement device measuring flow into the district metering area (supply meter(s)) and at least one flow measurement device measuring flow out of the district metering area (demand meter(s)). Each meter may be identifiable with a unique Meter_ID known by both the flow measurement device and network control system 110. Continuing the apartment example from above, the apartment building flow measurement device 202 can be designated as a supply meter and used to measure the flow into the DMA 210, while the plurality of apartment unit flow measurement devices 204 can be designated as a demand meters and used to measure the flow out of the DMA 210.

Network control system 110 is configured to receive data from the flow measurement devices 202, 204 to determine the flow into and out of the DMA 210. In this embodiment, the flow into DMA 210 is the flow measured by the apartment building flow measurement device 202 and the flow out of the DMA is the aggregation of the flow measured by all of the apartment unit flow measurement devices 204. Network control system 110 may be configured to generate both of a visualization of the district metering area 210 as shown in FIG. 2A and a tabular record of the flow measurement devices. For example, Table 1 below shows an exemplary embodiment of a table representing the utility supply network of FIG. 2A.

TABLE 1

| Meter_ID | Supply_Zone_ID | Demand_Zone_ID |
|---|---|---|
| M1 | Zone 1 | |
| M2 | | Zone 1 |
| M3 | | Zone 1 |
| M4 | | Zone 1 |
| M5 | | Zone 1 |
| M6 | | Zone 1 |

Utility supply network 200 is a simple representation of a limited utility supply network. In practice, utility supply networks are significantly more complex. Utility supply networks may include multiple utility sources, complex, looping and/or redundant networks of conduit, and a significant number of flow measurement devices. Referring now to FIG. 2B, a utility supply network 220 illustrating a utility supply network having some aspects representative of the types of complexities encountered in implementing a utility supply network is shown, according to an exemplary embodiment.

Utility supply network 220 may be another virtual representation of a utility supply network. In this example, network control system 110 is configured to implement a system and method of identifying and describing a plurality of DMA zones by designating each meter as a supply or demand meter for the zone, wherein a meter may include different designations in different zones.

Utility supply network 220 again includes a plurality of flow measurement devices 132 measuring flow into and out of the supply network 220. In this example, utility supply network 220 includes two utility supply source meters 222. Utility supply source meters 222 may be water meters measuring flow from a water reservoir and from a water purification facility, for example. The utility supply network further includes a plurality of water distribution site meters 224 receiving the water from the sources and further distributing it within supply network 220. Each water distribution site meter 224 may be associated with a different purpose. For example, the flow measurement device having Meter_ID M3 may be distributing water to an endpoint meter 226 having Meter_ID M7 associated with an industrial property. Flow measurement devices having Meter_IDs M4 and M5 may be distributing water to an endpoint meters 226 having Meter_IDs M8-M10 associated with commercial properties. The network 220 also includes a meter 226 having Meter_ID M9 that is receives water being measured by both the meter 224 having Meter_ID M4 and the meter 224 having Meter_ID M5. Flow measurement devices having Meter_ID M6 may be distributing water to an endpoint meters 226 having Meter_IDs M11-M16 associated with residential properties.

In this example, the network control system 110 may be configured to generate a first district metering area 230 designating utility supply source meters 222 as supply meters for the zone and water distribution site meters 224 as demand meters for the zone. As in the example from above, the flow measurement devices 222 can be designated as supply meters and the aggregate flow used to measure the flow into the DMA 230, while the endpoint devices 226 can be designated as a demand meters and used to measure the flow out of the DMA 230. However, it can be appreciated that the utility of this information is limited in view of the complexity of the network 220. Net utility flow discrepancies between inflows at flow measurement devices 222 and flow measurement devices 224 will not properly represent the entirety of network 220, while net utility flow discrepancies between inflows at flow measurement devices 222 and flow measurement devices 226 may be attributable to any aspect of the supply network 220 and difficult to address.

Accordingly, network control system 110 may be configured to generate a plurality of additional district metering areas for supply network 220. In this embodiment, network control system 110 is further configured to allow designation for each of the flow measurement devices to one or more district metering areas. Further, a flow measurement device may be designated as a supply meter in a first district metering area and a demand meter in a second district metering area. For example, Table 2 below shows an exemplary embodiment of a table representing the utility supply network of FIG. 2B implementing second district metering area 240, third district metering area 250, and fourth district metering area 250.

TABLE 2

| Meter_ID | Supply_Zone_ID | Dentand_Zone_ID |
|---|---|---|
| M1 | Zone 1 | |
| M2 | Zone 1 | |
| M3 | Zone 2 | Zone 1 |
| M4 | Zone 3 | Zone 1 |
| M5 | Zone 3 | Zone 1 |
| M6 | Zone 4 | Zone 1 |
| M7 | | Zone 2 |
| M8 | | Zone 3 |
| M9 | | Zone 3 |
| M10 | | Zone 3 |
| M11 | | Zone 4 |
| M12 | | Zone 4 |
| M13 | | Zone 4 |
| M14 | | Zone 4 |
| M15 | | Zone 4 |

Figure 3:
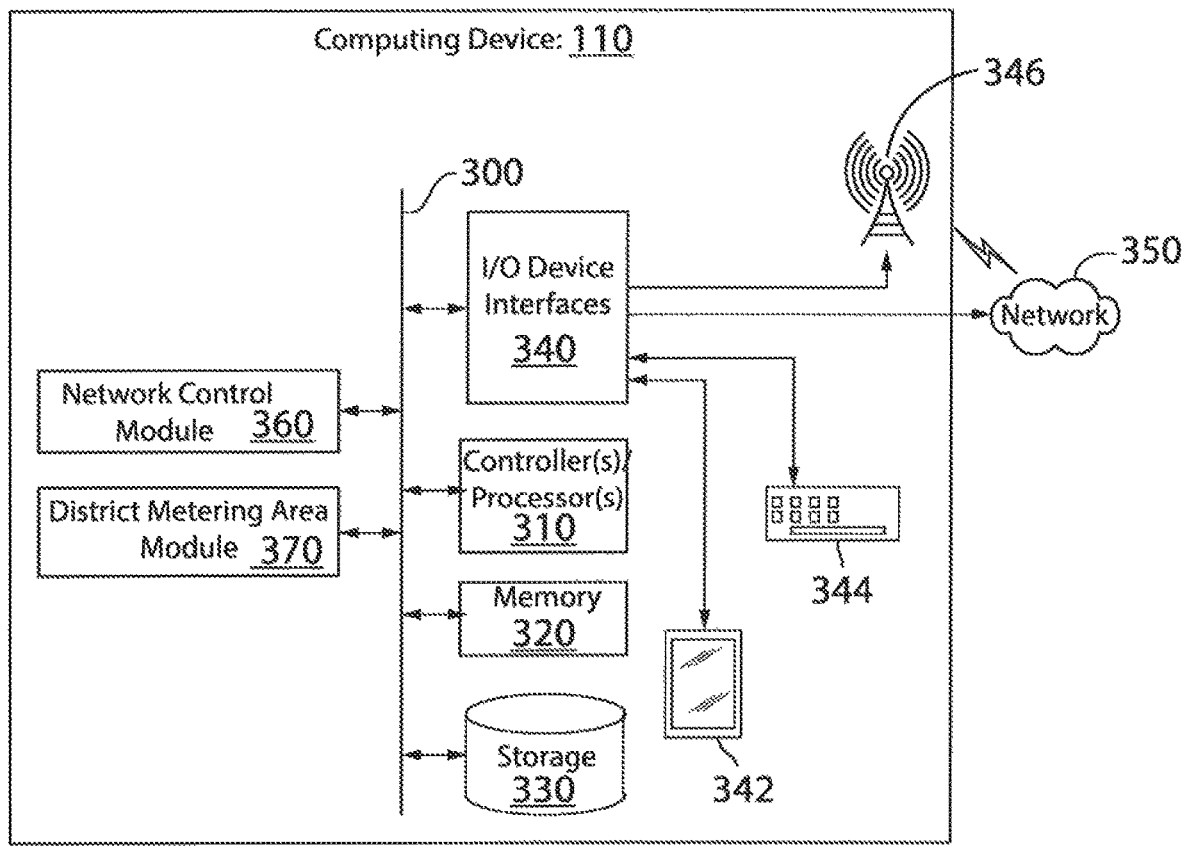
FIG. 3 is a block diagram illustrating examplary components of the network control system of FIG. 1, according to an exemplary embodiment.

Referring now to FIG. 3, network control module 360 is configured to cooperatively implement a network control interface 400 with district metering area module 370, according to an exemplary embodiment. Interface 400 is configured to display data generated for one or more of the district metering areas specified for a utility supply network. Interface 500 may further be utilized to control the operation of one or more components of a utility supply network, initiate and control generation of district metering areas as described herein, etc.

Designation of meters measuring inflows and/or outflows to a proposed district metering area allows generation of the district metering area without requiring that the utility supplier specify a network graph based on named nodes and named arcs with its inherent complications. Naming zones and designating inflow and outflow meters as supply and/or demand meters within the named zone has been found to be sufficient to capture and represent a directed acyclic graph describing a district metering area zone.

Network control system 110 is shown in additional detail, according to an exemplary embodiment. FIG. 3 is a block diagram conceptually illustrating example components of the network control system 110. In operation, the network control system 110 may include computer-readable and computer-executable instructions that reside on the network control system 110, as is discussed further below.

As illustrated in FIG. 3, the network control system 110 may include an address/data bus 300 for conveying data among components of the control system 110. Each component within the control system 110 may also be directly connected to other components in addition to (or instead of) being connected to other components across the bus 300. The control system 110 may include one or more microcontrollers/controllers/processors 310 that may each include a central processing unit (CPU) for processing data and computer-readable instructions, and a memory 320 for storing data and instructions. The memory 320 may include volatile random-access memory (RAM), non-volatile read only memory (ROM), non-volatile magnetoresistive (MRAM) and/or other types of memory. The control system 110 may also include a data storage component 330, for storing data and microcontrollers/controller/processor-executable instructions (e.g., instructions to perform one or more steps of the methods illustrated in and described herein). The data storage component 330 may include one or more non-volatile storage types such as magnetic storage, optical storage, solid-state storage, etc. The control system 110 may also be connected to removable or external non-volatile memory and/or storage (such as a removable memory card, memory key drive, networked storage, etc.) through input/output device interfaces 340.

Computer instructions for operating the control system 110 and its various components may be executed by the microcontroller(s)/controller(s)/processor(s) 310, using the memory 320 as temporary "working" storage at runtime. The computer instructions may be stored in a non-transitory manner in non-volatile memory 320, storage 330, or an external device. Alternatively, some or all of the executable instructions may be embedded in hardware or firmware in addition to or instead of software.

The control system 110 includes input/output device interfaces 340. A variety of components may be connected through the input/output device interfaces 3400, such as a display or display 342; a keyboard 344; and other components. The display 302, keyboard 344, and other components may be integrated into the control system 110 or may be separate. The display 342 may be a display of any suitable technology, such as a liquid crystal display, an organic light emitting diode display, electronic paper, an electrochromic display, a cathode ray tube display, a pico projector or other suitable component(s).

The input/output device interfaces 340 may also include an interface for an external peripheral device connection such as universal serial bus (USB), FireWire, Thunderbolt, Ethernet port or other connection protocol that may connect to networks 350. The input/output device interfaces 340 may also include a connection to antenna 346 to connect one or more networks 350 via a wireless local area network (WLAN) (such as WiFi) radio, Bluetooth, and/or wireless network radio, such as a radio capable of communication with a wireless communication network such as a Long-Term Evolution (LTE) network, WiMAX network, 3G network, etc.

The control system 110 further includes a network control module 360 that controls the operation the components in a utility supply network. Module 360 may be one or more computer programs and/or controllers including executable instructions that may be embedded in hardware or firmware in addition to, or instead of, software. For example, network control module 360 may be configured to control the operation of flow measurements devices 132 based on the district metering analytics generated for the district metering area, such as restricting flow through a flow measurement devices having remotely controlled shut off or restriction valves. Additionally, control module 360 may be configured to utility billing for district metering areas, water loss reporting, generating work orders to replace improperly sized flow measurement devices 132, reprogramming of flow measurement devices to adjust measurement resolution, etc.

The control system 110 may further include a district metering area module 370 configured to implement a district metering area algorithm as described herein. The DMA algorithm is configured to execute instructions to generate, modify, utilize, etc. district metering areas as described herein. "Algorithm" is a set of instructions to be followed in calculations or processing, especially by a computing device. In a computer implemented method or system, the term algorithm may be used interchangeably with the terms "rules" or "instructions," to refer to a sequence of steps to be carried out by a computer processor implementing instructions encoded in memory. An algorithm can be encoded in program code stored on a physical storage medium.

District metering area module 370 may be configured to determine the net utility flow discrepancy between the supply and demand meters in a DMA may represent unaccounted for water or revenue loss. The net utility flow discrepancy between the sum of supply and demand meters is the amount that the utility supplier needs to track. Network control system 110 may be configured to include threshold values of the net utility flow discrepancy where crossing the threshold will trigger an alert, initiate water shut off, etc. Network control system 110 may further be configured to track changes over a defined period of time, changes from a standard deviation in the net utility flow discrepancy, changes over any defined amount, etc.

Specifically, if the sum of supplies is more than the sum of demand, control system 110 determines that a measured utility supply loss is occurring within the district metering area. The measured loss may be caused by a variety of factors such as theft, measurement issues, utility supply network breakages such as pipe breaks, power line breaks, etc., leaky pipes, etc.

Alternatively, if the sum of demand is more than the sum of supply, control system 110 determines that supply meters are oversized. In measuring the flow of a utility through a flow measurement device, the flow measurement device may be configured to detect a flow in the meter and record units of the utility being supplied and/or demanded. For example, in generating utility consumption data for a user having a residential ⅝-inch water supply line with the typical residential meter, a meter register associated with the residential meter may have a resolution of 1/10 of a gallon. The meter register will measure a flow occurring even when that flow is less that the resolution amount, resulting in a measured value that is higher than the actual amount of the flow.

Figure 4:
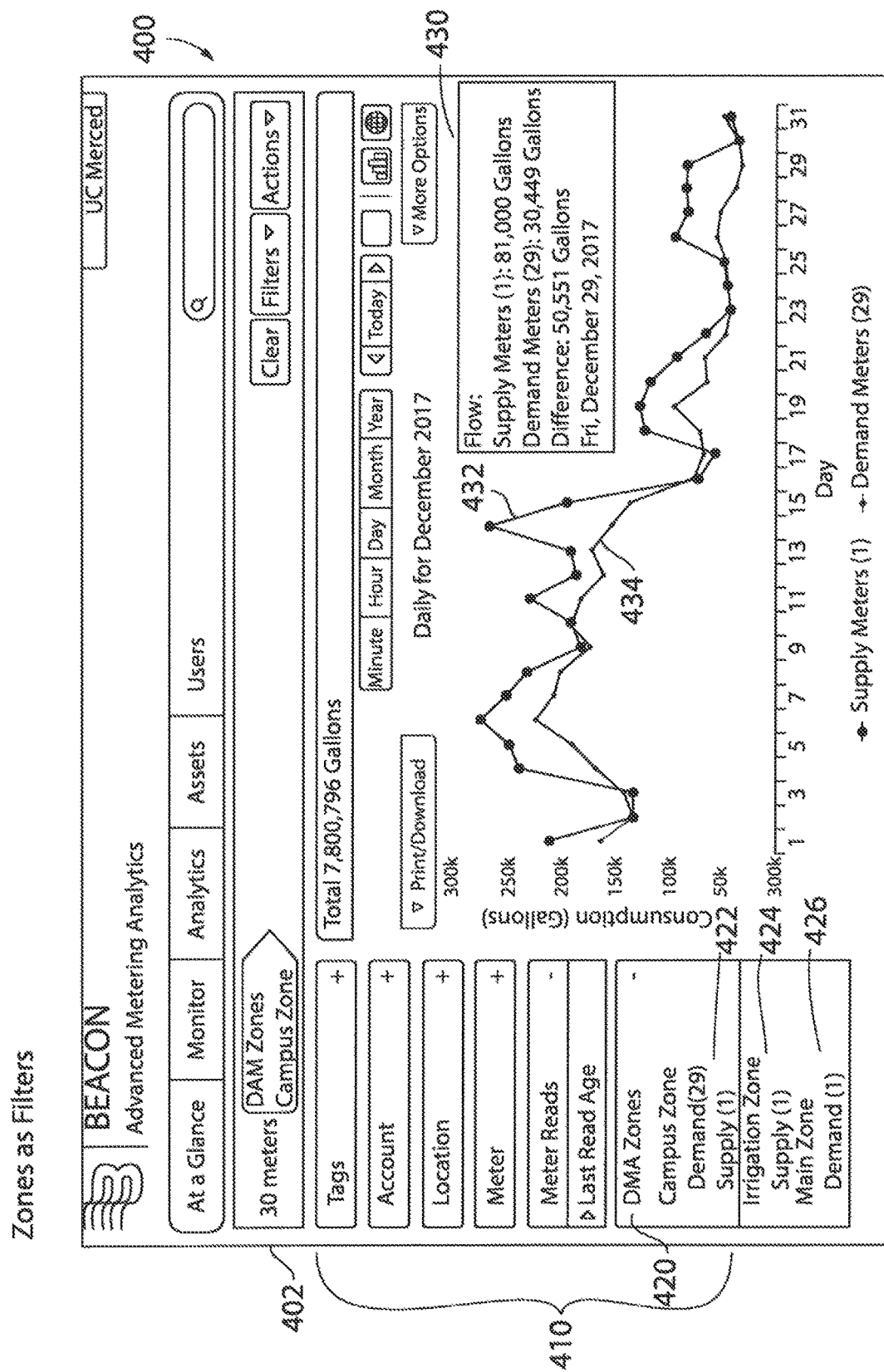
FIG. 4 is a network control interface including a network information bar identifying the utility supply network being controlled, the number of meters in the utility supply network, and a currently selected district metering area, according to an exemplary embodiment.

Referring now also to FIG. 4, network control system 110 is configured to implement a network control interface 400 including a network information bar 402 identifying the utility supply network being controlled, the number of meters in the utility supply network, and a currently selected district metering area. Control interface 400 further includes a network control menu 410 including a plurality of selectable control functions allowing a user to tag specific meters, control flow measurement devices for specific accounts, control flow measurement devices for specific locations, flow measurement devices for a selected meter, determine meter reading timing, etc. Control menu 410 further includes a DMA reporting function 420, selection of which will initiate display of a DMA reporting display 430.

DMA reporting display 430 is a graphical representation of consumption over time for a district metering area selected in a drop-down menu based on selection of the DMA reporting function 420. In the embodiment shown in FIG. 4, a district metering area associated with a campus zone 422 has been selected from a list also including an irrigation zone 424 and a main zone 426. As shown in the figure, campus zone 422 is defined by 1 meter designated as a supply meter and 29 meters designated as demand meters.

Reporting display 430 depicts two-line graphs: a first line graph 432 representing an aggregate supply flow, the amount of measured flow entering campus zone 422 (in this case the amount measured at the single designated supply meter) and a second line graph 434 representing an aggregate demand flow, the amount of measured flow leaving campus zone 422 (in this case the amount measured at the 29 designated demand meters) at different intervals of time. One of ordinary skill would understand that reporting display 430 may be customized to display over different time intervals, to display the net utility flow discrepancy between supply and demand meters in the campus zone 422, and to display a historical record of measured flows for the district metering area.

Referring now to FIG. 5, a flow chart 500 illustrates the steps implemented by the DMA algorithm stored in the memory to configure a district metering area including flow measurement devices that may be designated as being included in multiple district metering areas and as either supply meters or demand meters or both.

In a step 505, district metering area module 370 is configured to analyze a utility network to determine zone topologies and identify the flow measurement devices 132 in the network within each of the determined zone topologies. The analytics may include optimization of zone topologies based on inputs provided by a user including, but not limited to, total flow amounts, geographic designations, water use designation, flow measurement device numbers, etc.

In a step 510, district metering area module 370 generates a zone designation for each of the identified flow measurement devices 132. Further, within each of the zone designation, each flow measurement device 132 is designated as being one of a supply or demand meter for the zone designation. A single flow measurement device 132 may receive different supply and/or demand designations for different zones, e.g., a supply designation for zone A and a demand designation within zone B.

In a step 515, district metering area module 370 generates a directed acyclic graph based upon the zone designations. The directed acyclic graph is a directed graph with no directed cycles such that every flow measurement device 132 designated as a supply meter is upstream from at least one flow measurement device 132 designated as a demand meter and no flow measurement device 132 designated as a supply meter is downstream from a flow measurement device 132 designated as a demand meter. Additionally, each flow measurement device 132 designated as a demand meter is necessarily downstream from at least one flow measurement device 132 designated as a supply meter. Each zone forms a unique district metering area.

In operation, flow measurement devices 132 generate meter data that is transmitted to system 110. The meter data can include utility consumption data stored at system 100 to provide a consumption over time record from each flow measurement device 132. The data record may be stored as flow timeseries data for the particular device 132 in a step 520. In addition to the consumption data, the meter data may further include additional information specific to the flow measurement device 132 such as tamper alerts, leak detection alerts, reverse flow indications, battery indication, meter condition information, etc.

In a step 525, district metering area module 370 is configured to generate a flow timeseries for each zone by aggregating the flow timeseries data for the particular devices 132 that were associated with the zone in step 510. In a step 530, district metering area module 370 is configured to generate DMA reporting display 430 for each district metering area identified by a zone as designated in step 515. DMA reporting display 430 is the graphical representation of consumption over time, described above with reference to FIG. 4, for a district metering area.

In a step 535, network control module 360 is configured to perform one of more network control actions based on the flow timeseries for each zone generated in step 525 and/or displayed in step 530. The actions taken may be made based on the net utility flow amounts and/or discrepancies between inflows at supply flow measurement devices and demand flow measurement devices as described above with reference to FIG. 2. Exemplary network control actions may be, but are not limited to, actuating remotely controlled valves at demand flow measurement devices based on detected leak conditions, tampering conditions, theft conditions, billing issues, etc., restricting utility flow into a zone at a supply flow measurement device based on the same, generating utility supply accounting information for the zone and/or each individual demand flow measurement device, identifying full measurement device sizing issues and taking corrective action based upon the sizing issue, such as ordering device replacement, device reprogramming, etc.

Network control module 360 is configured to for dynamic limitation of the zones defining the district metering areas. For example, network control module 360 is configured to recognize the addition and/or removal of a flow measurement device 132 from the network. Based on this detection, network control module 360 may be configured to generate new zones based on network topology and updating designation of flow measurement devices based on the addition of the new flow measurement device, implementing step 505 based on the detected new flow measurement device 132.

The present invention may be implemented in hardware and/or in software. Many components of the system, for example, network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A computer implemented method implemented on a computer system including non-transient memory storing instructions for configuring a plurality of district metering areas within a utility supply network, comprising:
    identifying a plurality of flow measurement devices, wherein each flow measurement device is connected by a directional connection to at least one other flow measurement device;
    generating a utility supply network representation based on the directional connections between the flow measurement devices; and
    generating a plurality of district metering areas for the utility supply network representation, each district metering area being a directed acyclic graph based on the directional connections and including a subset of the plurality of flow measuring devices and including at least one flow measurement device designated as a supply meter and at least one flow measurement device designated as a demand meter.

2. The method of claim 1, wherein at least one flow measurement device is designated as a supply meter in a first district metering area and designated as a demand meter in a second district metering area.

3. The method of claim 1, further including generating a listing of flow measurement devices that are not included in a subset for a district metering area for the utility supply network representation.

4. The method of claim 1, further including determining a net utility flow discrepancy based on a comparison of the aggregate supply flow, measured by flow meters designated as supply meters, and the aggregate demand flow, measured by flow meters designated as demand meters.

5. The method of claim 4, further including replacing one or more meters in a district metering area based on a determination that the aggregate supply flow has been less than the aggregate demand flow over one of a defined period of time and by a defined amount.

6. The method of claim 4, further including initiating loss mitigation in a district metering area based on a determination that the aggregate supply flow has been greater than the aggregate demand flow over one of a defined period of time and a defined amount.

7. The method of claim 4, further including modifying the operation of one or more flow measurement devices based on the determined net utility flow discrepancy.

8. The method of claim 1, further including regenerating the utility supply network representation and the plurality of district metering areas for the utility supply network based on a detected change to one or more flow measurement devices in the utility supply network.

9. A computer system executing instructions, stored in non-transient memory, for configuring a plurality of district metering areas within a utility supply network, comprising:
    a network control system configured to
        identify a plurality of flow measurement devices, wherein each flow measurement device is connected by a directional connection to at least one other flow measurement device and
        generate a utility supply network representation based on the directional connections between the flow measurement devices; and
    a district metering system configured to generate a plurality of district metering areas for the utility supply network representation, each district metering area being a directed acyclic graph based on the directional connections and including a subset of the plurality of flow measuring devices and including at least one flow measurement device designated as a supply meter and at least one flow measurement device designated as a demand meter.

10. The computer system of claim 9, wherein at least one flow measurement device is designated as a supply meter in a first district metering area and designated as a demand meter in a second district metering area.

11. The computer system of claim 9, wherein the district metering system is further configured to generate a listing of flow measurement devices that are not included in a subset for a district metering area for the utility supply network representation.

12. The computer system of claim 9, further including determining a net utility flow discrepancy based on a comparison of the aggregate supply flow, measured by flow meters designated as supply meters, and the aggregate demand flow, measured by flow meters designated as demand meters.

13. The computer system of claim 12, wherein the district metering system is further configured to order the replacement of one or more meters in a district metering area based on a determination that the aggregate supply flow has been less than the aggregate demand flow over one of a defined period of time and by a defined amount.

14. The computer system of claim 12, wherein the district metering system is further configured to initiate loss mitigation in a district metering area based on a determination that the aggregate supply flow has been greater than the aggregate demand flow over one of a defined period of time and a defined amount.

15. The computer system of claim 12, wherein the district metering system is further configured to modify the operation of one or more flow measurement devices based on the determined net utility flow discrepancy.

16. The computer system of claim 9, wherein the network control system is further configured to regenerate the utility supply network representation and the plurality of district metering areas for the utility supply network based on a detected change to one or more flow measurement devices in the utility supply network.

* * * * *